United States Patent [19]
Gepfert et al.

[11] Patent Number: 5,387,072
[45] Date of Patent: Feb. 7, 1995

[54] APPARATUS FOR STACKING TUBE AND RELATED METHOD

[75] Inventors: Paul J. Gepfert, Cleveland, Ohio; Yukio Kusakabe, Kobe, Japan

[73] Assignee: XTH Corporation, Cleveland, Ohio

[21] Appl. No.: 83,995

[22] Filed: Jun. 28, 1993

Related U.S. Application Data

[63] Continuation-in-part of Ser. No. 776,821, Oct. 15, 1991, Pat. No. 5,222,859.

[51] Int. Cl.⁶ .................................................. B65G 57/03
[52] U.S. Cl. .............................. 414/794.3; 414/793.4; 414/792.5; 414/746.4; 414/924; 198/431
[58] Field of Search ............... 414/794.3, 793.4, 792.5, 414/746.4, 924, 746.7, 746.8, 786; 198/418.6, 431

[56] References Cited

U.S. PATENT DOCUMENTS

| | | | |
|---|---|---|---|
| 3,101,851 | 8/1963 | Heide et al. | 414/924 |
| 3,343,689 | 9/1967 | Fehely | 414/794.3 |
| 3,627,150 | 12/1971 | Kazeef et al. | 414/792.5 |
| 4,174,662 | 11/1979 | Klusmier | 414/746.3 |
| 4,389,148 | 6/1983 | Lorenz | 414/794.3 |
| 4,439,099 | 3/1984 | Asari et al. | 414/792.5 |
| 4,623,291 | 11/1986 | Buck | 414/794.3 |

FOREIGN PATENT DOCUMENTS

| | | | |
|---|---|---|---|
| 2452144 | 5/1976 | Germany | 414/794.3 |
| 1062151 | 12/1983 | U.S.S.R. | 414/746.7 |
| 1546394 | 2/1990 | U.S.S.R. | 414/794.3 |
| 1738443 | 6/1992 | U.S.S.R. | 414/746.4 |

OTHER PUBLICATIONS

Disclosure Exhibits 1 through 9—Copies of Photographs—showing various portions of a tube stacking apparatus from the Japanese company Kusakabe, no date.

Disclosure Exhibit 10—Blueprint drawing entitled "Pack Pipe SQ Hex", Sep. 11, 1989.

Brochure—"MAIR Research Automatic Stacking and Building Systems", provided by MAIR Research, S.P.A., Bentley Industrial Corporation, Woodside, New York, no date.

Brochure—"Just Sit Down and Bundle Everything Your Tube Mill Can Produce", published by Rautaruukki of Finland, no date.

*Primary Examiner*—H. Grant Skaggs
*Attorney, Agent, or Firm*—Renner, Kenner, Greive, Bobak, Taylor & Weber

[57] ABSTRACT

The present invention is directed toward positioning tube (11) from a continuous supply of tube (11), into a preselected stacked configuration in a stack forming assembly (12) by movement of a fork member (22) positionable under selected of the tube (11). The invention includes moving the fork member (22) a preselected distance to position a preselected number of the tube (11) in the forming assembly (12) to form a row of preselected length, and then restraining the remainder of the supply of tube (11). The fork member (22) is then retracted a predetermined distance away from the forming assembly (12), and the forming assembly (12) is lowered so that additional tube (11) may be positioned on top of the tube (11) already positioned therein. The remainder of the tube (11) is then released while again moving the fork member (22) a preselected distance to position a preselected number of tube (11) on top of the tube (11) already positioned in the forming assembly (12). The steps are then repeated until the preselected stacked configuration is achieved. A-stop member (252) may be provided to help prevent vertical displacement of a lead tube (11b). Also, a belt (280) may be provided to prevent displacement of other tube (11) in a given row.

13 Claims, 11 Drawing Sheets

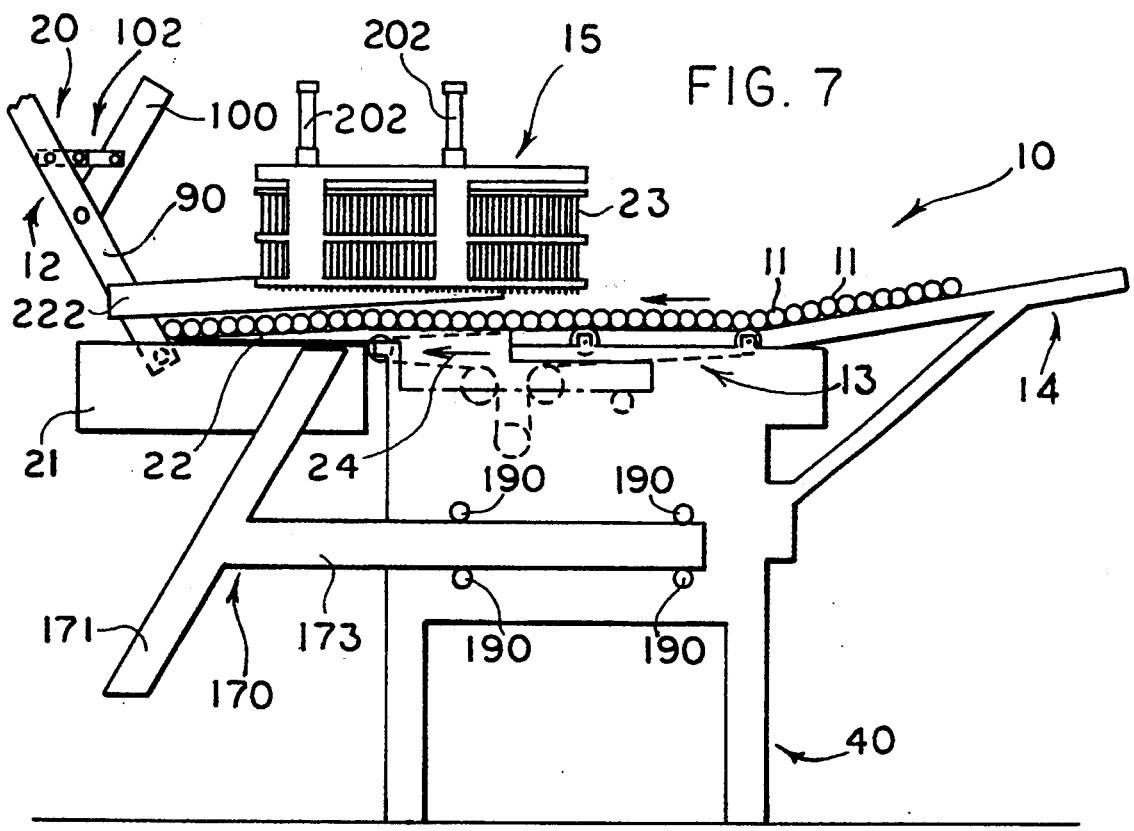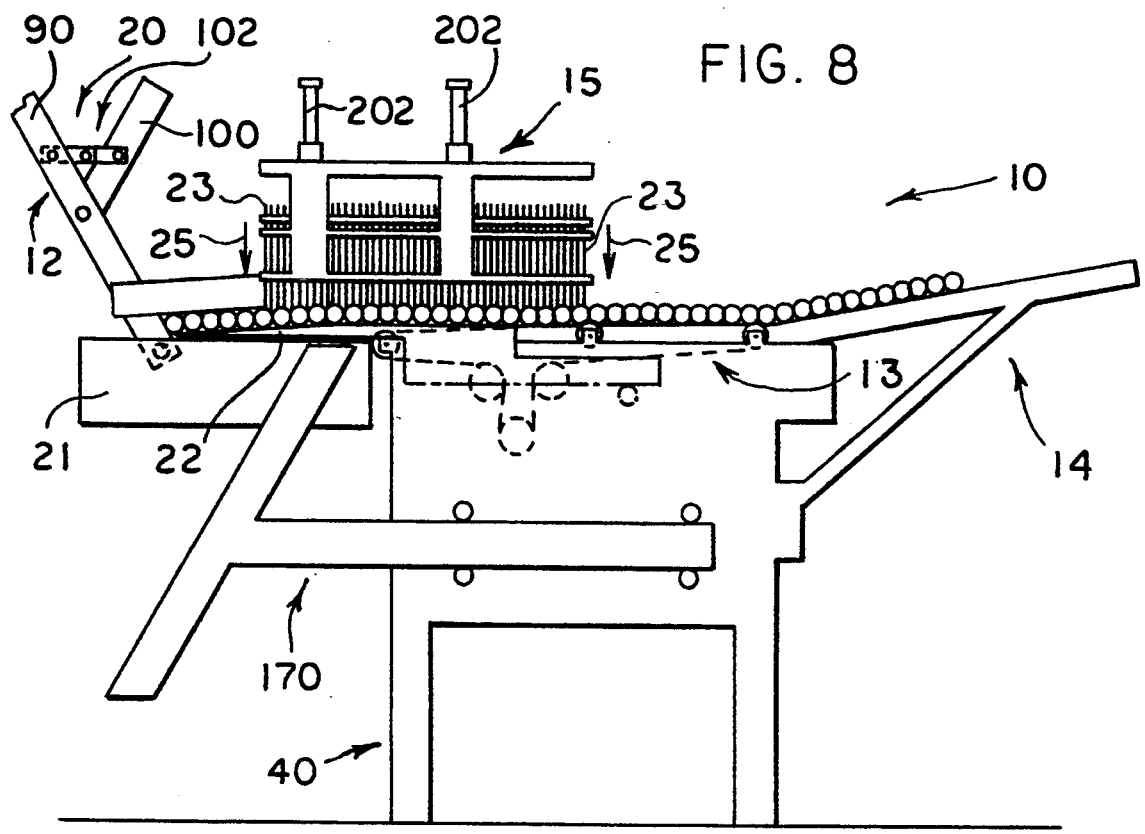

APPARATUS FOR STACKING TUBE AND RELATED METHOD

CROSS REFERENCE TO RELATED APPLICATIONS

The present application is a continuation-in-part of co-pending application U.S. Ser. No. 07/776,821 filed Oct. 15, 1991, now U.S. Pat. No. 5,222,859.

TECHNICAL FIELD

This invention relates to an apparatus and method for stacking tube. More particularly, the invention relates to an apparatus and method for stacking tube into a stack of predetermined shape for bundling, storage or the like.

BACKGROUND ART

As used herein, the term "tube" shall be used to collectively refer to pipe, tubing or the like of any length or cross-section unless otherwise specified.

It is known in the tube manufacturing industry, to provide for automatic, manual or semi-automatic (a combination of automatic and manual) handling of the tube for efficiency and ease of operation. The tube is often transferred from a runout table to a bundling station, where the tube is stacked and banded for storage and/or shipment. Tube is often stacked into stacks of a variety of shapes. For example, it is known to stack tube having a round cross section into hexagonal stacks, and square or rectangular cross section tube into square and/or rectangular stacks. Round tube is sometimes stacked into approximately square or rectangular stacks. The stacks of tube are then banded or strapped with metal or plastic strapping, or blocked with other materials such as wood. The banded stacks are easier to transport and otherwise handle than free tube. Stacking and banding or blocking may be generally referred to as "bundling".

To stack tube, it is necessary to lift and/or transfer the tubing from one location to another, such as to a framing or stack forming unit. In the past, such transfer was accomplished by a number of devices, including cranes and magnets. Magnets have proven inefficient because it is often difficult to hold the tube in a linearly oriented position, and nonmetallic tubing is, of course, not susceptible to such an operation. Cranes on the other hand are difficult to employ because they must be loaded and unloaded.

Other tube stacking apparatus known in the art have employed pivotable fork members which actually pivot downwardly to cause tube to roll or fall off of the fork. The fork is then retracted and a pawl or the like is employed to "scrape" any pipe remaining on the fork therefrom.

Many tube stacking apparatus have been required to separate tube from a supply of tube into discrete batches of a number of tube. The tube is then stacked according to the operation of the apparatus. A problem with creating discrete batches is that more room is required for the machine because a space between each batch must be provided. While the space may be small, space is still a commodity which must be conserved. Therefore, "batching" type machines have proven to present an economic and physical limitation to the use of those machines for the owners thereof.

It is often the case that one bundling station will be expected to bundle tubes of various dimensions and cross sectional configurations. A framing assembly is often provided which approximates the shape of the desired finished stack, into which the tube is transported. For example, if round tube if to be bundled into a hexagonal shaped stack, a hexagonal shaped frame assembly is required. If the same apparatus is to then be used to stack square tube into a square stack, then it has been necessary to replace the framing assembly with one that is square in shape.

The number of tube to be delivered to the framing assembly is critical. Most stacking apparatus heretofore known in the art has been provided with some means to count the number of tube actually delivered, stopping when the appropriate number of tube has been reached. Such devices often use a sensor or the like to count the tube as they pass over the sensor. This has proven somewhat difficult with stacks that have rows of tubes of varying numbers. For example, the hexagonal stack will have a first row of a certain number of tube, a second row which has one more tube than the first, and so forth to the row with the most number of tube. The subsequent rows then decrease in number of tube.

A need exists for an apparatus for stacking tube for bundling or the like, which is easily adaptable to be used for stacking the tube into a variety of stack shapes, and which efficiently delivers the correct number of tube to the stack.

DISCLOSURE OF THE INVENTION

It is therefore an object of the present invention to provide a method and apparatus for stacking tube.

It is another object of the present invention to provide a method and apparatus, as above, which may be employed to stack .tube of a variety of cross sectional shapes.

It is yet another object of the present invention to provide a method and apparatus, as above, for stacking tube into stacks of a variety of shapes for subsequent bundling.

It is still another object to provide a method and apparatus, as above, which efficiently delivers a variable and predetermined number of tube to the stack.

It is a further object of the present invention to provide a method and apparatus, as above, which does not rely on counting the number of tube to form the stack.

At least one or more of the foregoing objects, together with the advantages thereof over the known art relating to automatic, manual and/or semi-automatic tube stacking apparatus, which shall become apparent from the specification which follows, are accomplished by the invention as hereinafter described and claimed.

In general, the present invention provides an apparatus for stacking a plurality of tube into a stack of predetermined shape. The apparatus comprises a main framework, a cradle and a tube framing assembly having an upstanding arm for at least partially supporting the stacked tube. The apparatus also comprises generally laterally movable fork means for delivering the tube to the cradle and the framing assembly; the fork means including drive means for variably and selectively moving the fork means toward and away from the upstanding arm to a predetermined position relative the framing assembly. There is also provided means to move the cradle relative to the lateral movement of the fork means. Also,a tube restraining assembly is positioned generally proximate the fork means and the cradle which has a plurality of retractable, free floating finger means engageable with the tube on the fork means. The number of tube delivered to the cradle and the framing assembly is determined by the predetermined position of the fork means, the remaining tube on the fork means being restrained thereon by at least one of the finger means.

Also according to the present invention, there is provided an apparatus to stack tube in a framing assembly, which comprises a tube restraining assembly positioned proximate the framing assembly and having a plurality of free floating fingers to engage and restrain at least one of the tube to prevent the tube from moving into the framing assembly.

The present invention also includes a method of positioning tube, from a continuous supply of tube, in a preselected stacked configuration in a stack forming assembly by movement of a fork member positionable under selected of the tube. The method includes the steps of:

a) moving the fork member a preselected distance to position a preselected number of the tube in the forming assembly;
b) restraining the remainder of the supply of tube;
c) retracting the fork member a predetermined distance away from the forming assembly;
d) lowering the forming assembly so that additional tube may be positioned on top of the tube already positioned therein;
e) releasing the remainder of the continuous supply of tube while again moving the fork member a preselected distance to position a preselected number of tube on top of the tube already positioned in the forming assembly;
f) and repeating steps (b) through (e) until the preselected stacked configuration is achieved.

BRIEF DESCRIPTION OF THE DRAWINGS

FIG. 7 is a somewhat schematic side elevational view of the apparatus of FIG. 1 shown in one mode of operation sequence.

FIG. 8 is a somewhat schematic side elevational view of the apparatus of FIG. 1 shown in another mode of operation sequence.

PREFERRED EMBODIMENTS FOR CARRYING OUT THE INVENTION

Figure 1:
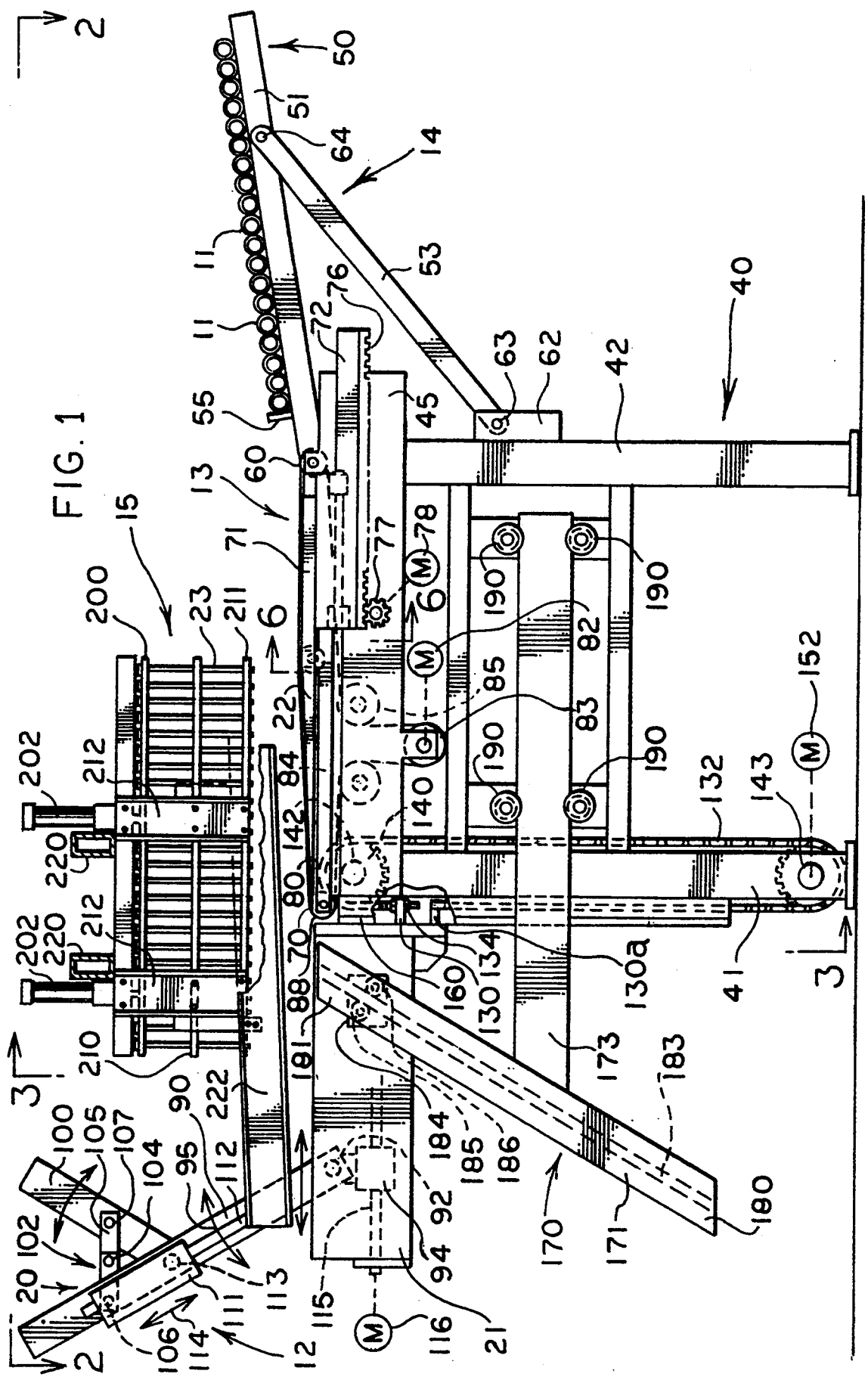
FIG. 1 is a side elevational, partially cut away, view of a tube stacking apparatus according to the concepts of the present invention.

The present invention is directed toward a tube stacking apparatus, generally indicated by the numeral 10 in the attached drawings. As will be more fully discussed hereinbelow, tube stacking apparatus 10 may be employed to stack tube having a variety of lengths and cross sectional configurations into stacks of varying size and shape. For example, as shown in the drawings tube 11, having a round cross sectional configuration, may be stacked into a hexagonal stack by employing tube stacking apparatus 10, as depicted in the drawings. One skilled in the art will appreciate from the following discussion how tube stacking apparatus 10 may be employed to stack tube of other cross sectional configurations, and how tube may be stacked in other shapes, all of which are within the scope of this invention.

Tube stacking apparatus 10 includes a framing assembly generally indicated by the numeral 12. For exemplary purposes, framing assembly 12 is depicted in the drawings as being configured to stack tube 11 into a hexagonal shaped stack. Tube stacking apparatus 10 also includes a fork assembly, generally indicated by the numeral 13, for use in delivering tube 11 from a tube storage or feed assembly generally indicated by the numeral 14, to framing assembly 12, where a plurality of tube 11 are actually stacked. Tube 11 may be transferred to feed assembly 14 from a runout table (not shown), from tube storage or the like, as is known in the art.

There is also provided at least one tube restraining assembly, generally indicated by the numeral 15, which is positioned proximate to framing assembly 12 and fork assembly 13, such that tube restraining assembly 15 is generally positioned vertically above framing assembly 12 and fork assembly 13 as depicted in FIGS. 1 and 7-14 of the drawings.

Framing assembly 12 is provided with an upstanding support structure generally indicated by the number 20, adjustably affixed to a cradle 21, as will be more fully discussed hereinbelow. Fork assembly 13 is provided with at least one tine member 22 which may be displaced in a lateral direction relative to a second tine member 22. Tube restraining assembly 15 is provided with a plurality of free floating fingers 23, which will be more fully described hereinbelow. Fingers 23 may be variably positioned with respect to fork assembly 13 and cradle 21, such that fingers 23 may be made to engage tube 11 thereon, as will also be more fully discussed hereinbelow.

Before discussing the details of the components just described, reference is made to FIGS. 7-14 for a discussion of the overall operation steps performed by tube stacking apparatus 10. With reference to FIG. 7, tube 11 are placed in preferably, a single row, onto fork assembly 13 such as by use of tube feed assembly 14. Tube 11 are delivered to framing assembly 12 by tine member 22 being moved toward upstanding support structure 20 of framing assembly 12, such movement being induced by means to be hereinafter described. By "delivered" it is understood to mean that the action, position and/or structure of tine member 22 causes at least one, and preferably a plurality of tube 11 to be positioned within framing assembly 12, such that tube 11 (either one or a plurality) are supported by framing assembly 12. However, as will be appreciated by one skilled in the art, the present invention may be practiced with means other than the specific fork assembly shown for delivering tube 11 to framing assembly 12.

The lateral direction of movement of tine member 22 toward upstanding support structure 20 is depicted in FIG. 7 by arrow 24. Preferably, fork assembly 13 is actuated such that tine member 22 is caused to move toward upstanding support structure 20 until tine member 22 actually touches upstanding support structure 20 or until it is proximate thereto. Tube 11 is thereby carried by fork assembly 13 to framing assembly 12.

As shown in FIG. 8, tube restraining assembly 15 is then actuated to cause free floating fingers 23 to be moved toward tube 11, by means to be hereinafter described, until fingers 23 actually engage or touch tube 11. Direction of movement of fingers 23 toward tube 11 is depicted in FIG. 8 by arrows 25.

Figure 9:
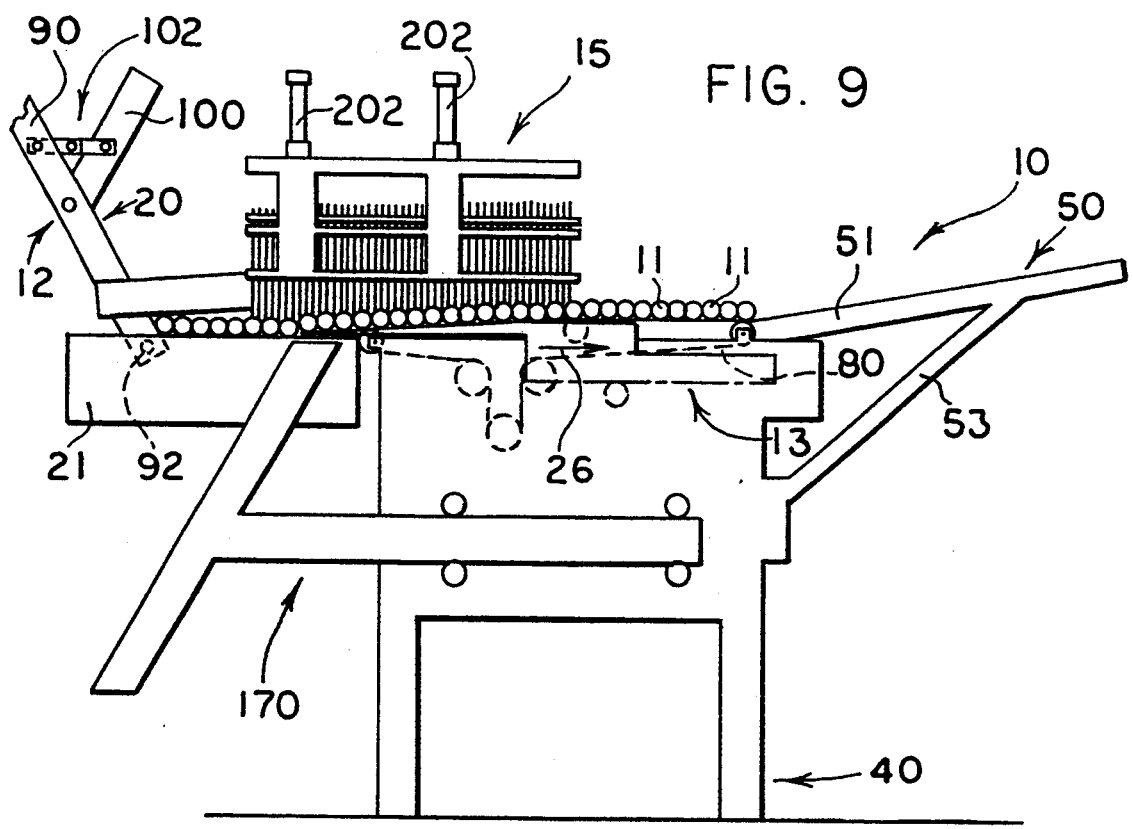
FIG. 9 is a somewhat schematic side elevational view of the apparatus of FIG. 1 shown in another mode of operation sequence.

Fork assembly 13 is then again activated, such that tine member 22 is caused to move in a direction away from upstanding support structure 20, as shown in FIG. 9 by arrow 26. A predetermined number of tube 11 are caused to remain on framing assembly 12, and more particularly, on cradle 21 by means to be discussed hereinbelow.

Figure 10:
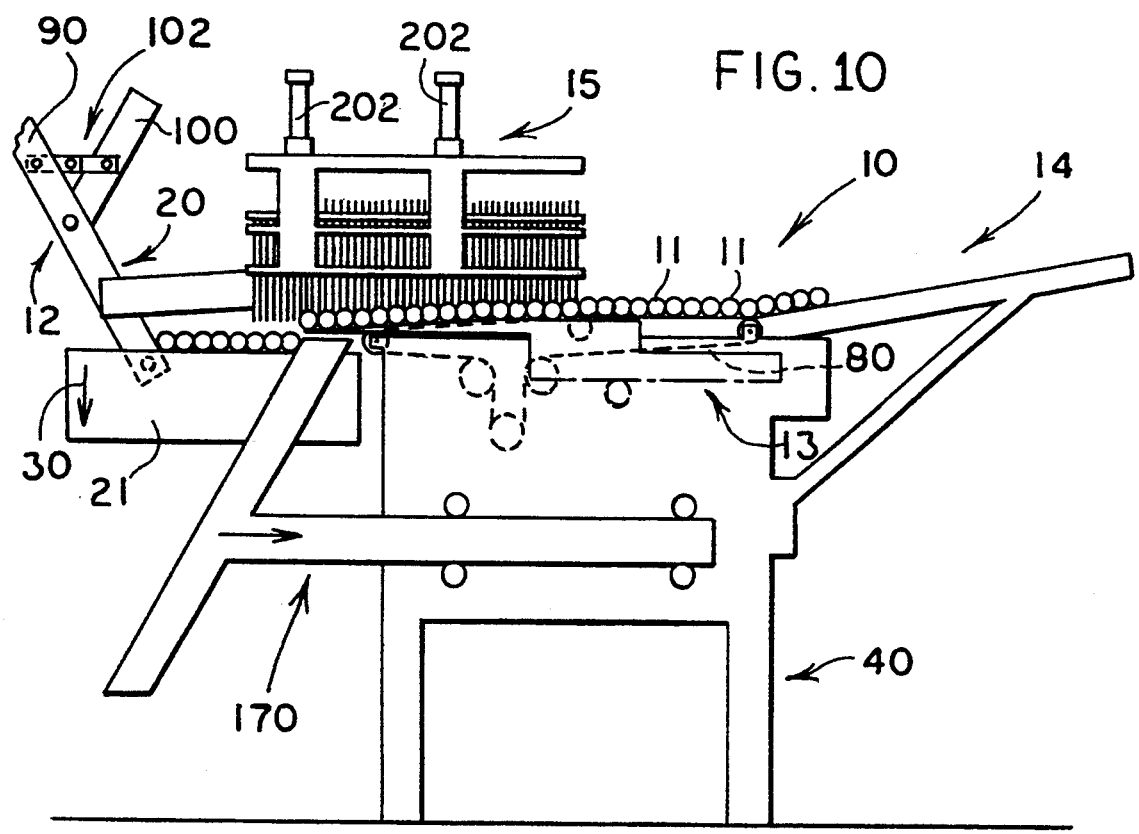
FIG. 10 is a somewhat schematic side elevational view of the apparatus of FIG. 1 shown in another mode of operation sequence.

Next in sequence, as shown in FIG. 10, cradle 21 is displaced relative to fork assembly 13. In the configuration of the invention depicted in FIG. 8, cradle 21 is lowered in a direction shown by arrow 30. By "lowered" it is understood to mean moved in a direction away from tube restraining assembly 15, and it is meant to mean a downward vertical movement relative to the tube stacking apparatus 10 as shown in FIG. 8. Preferably, cradle 21 is lowered a distance at least equal to the diameter of one tube 11, for reasons which will be understood by one skilled in the art from the discussion to follow. At least one free floating finger 23 is in contact with the last tube 11 on tine member 22, preventing that tube 11 from falling, rolling or otherwise coming into contact with framing assembly 12.

Figure 11:
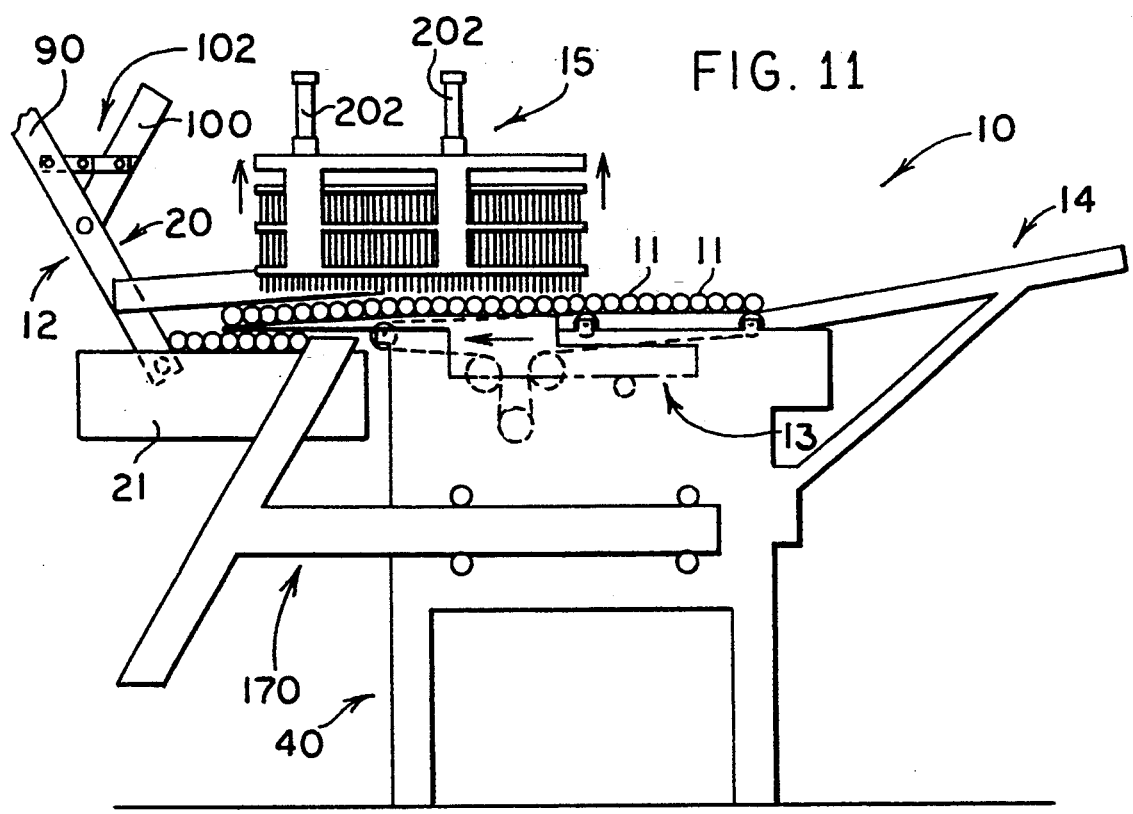
FIG. 11 is a somewhat schematic side elevational view of the apparatus of FIG. 1 shown in another mode of operation sequence.

To continue to form the stack of tube 11, tine member 22 is again moved toward upstanding support structure 20 while substantially simultaneously tube restraining assembly 15 is activated to retract fingers 23 substantially from contact with tube 11 (FIG. 11). This sequence is successively repeated until the desired number of tube have been stacked (FIG. 12).

It will be appreciated by one skilled in the art, that the number of tube delivered to framing assembly 12 is dependent upon the controlled position of tine member 22 relative to framing assembly 12 when cradle 21 is lowered. For example, as shown in FIG. 9, if tine member 22 is laterally moved away from upstanding support structure 20 a distance greater than the diameter of eight tube 11, but less than the combined diameter of nine tube 11, then eight tube 11 will remain in contact with cradle 21 when tine member 22 is so moved. By predetermining the position of tine member 22 relative to framing assembly 12, that is, by controlling the distance which tine member 22 is moved away from upstanding support structure 20, the number of tube delivered to framing assembly 12 can also be predetermined. Furthermore, by varying the distance of travel of tine member 22 away from upstanding support structure 20, the number of tube can be varied, such as necessary to form a hexagonal stack of tube 31 as shown in FIG. 12. Furthermore, because cradle 21 is lowered at least the diameter of the tube 11, tine member 22 is not impeded by the already delivered tube 11 and is likewise not prevented from delivering another row of tube 11 to framing assembly 12.

Figure 12:
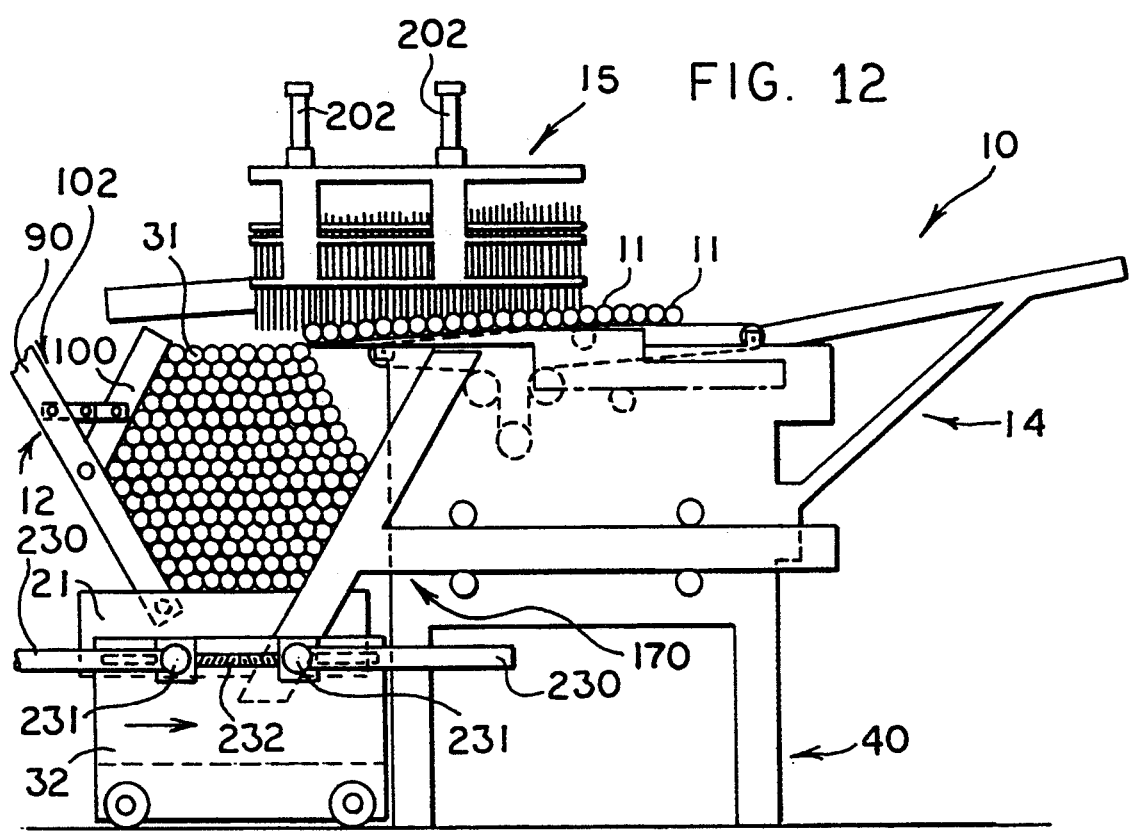
FIG. 12 is a somewhat schematic side elevational view of the apparatus of FIG. 1 shown in another mode of operation sequence.
Figure 13:
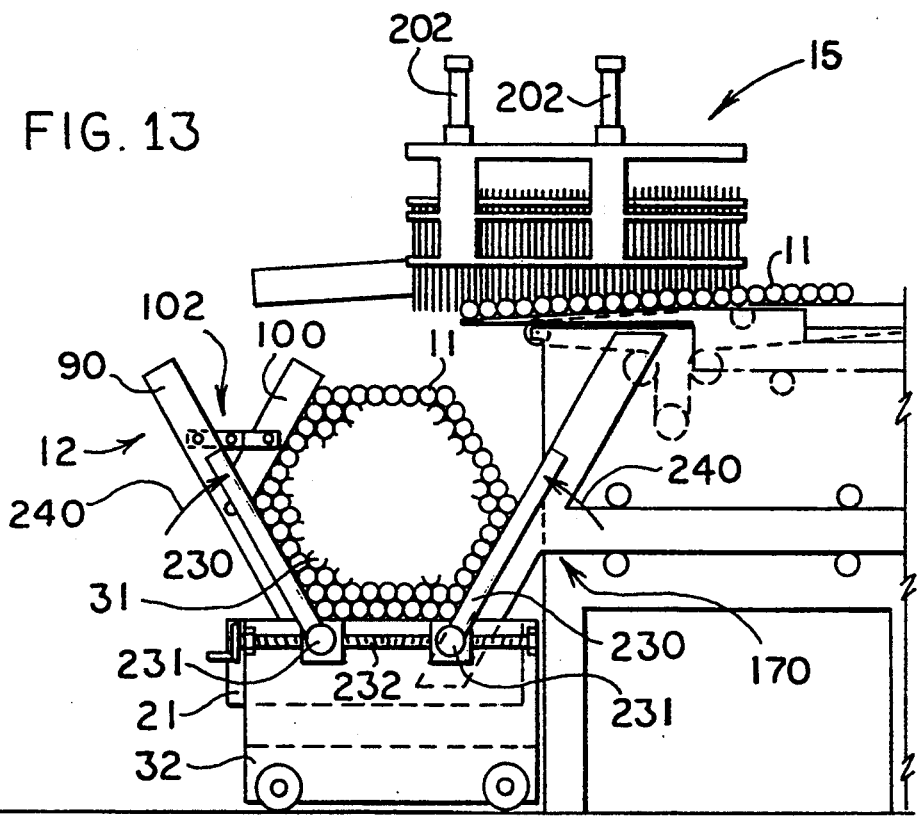
FIG. 13 is a somewhat schematic side elevational view of the apparatus of FIG. 1 shown in another mode of operation sequence.
Figure 14:
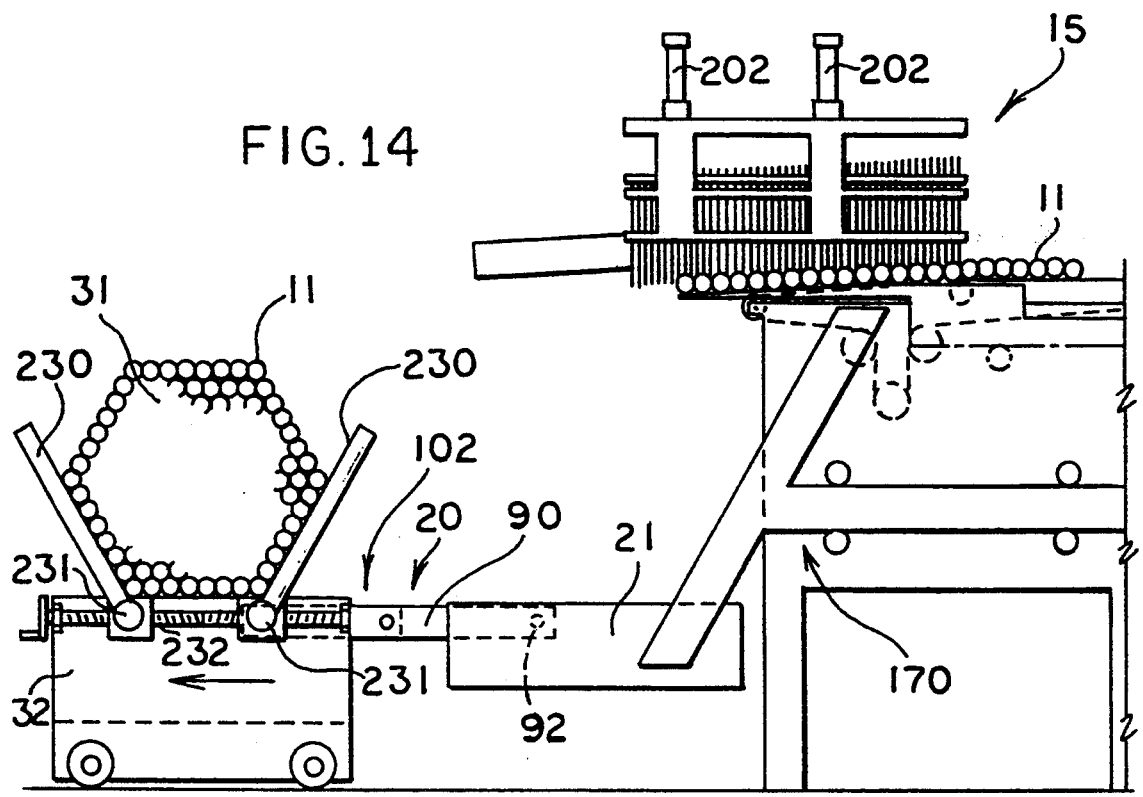
FIG. 14 is a somewhat schematic side elevational view of the apparatus of FIG. 1 shown in another mode of operation sequence.

As shown in FIGS. 12, 13 and 14, and as will hereinafter be described in detail, a device such as cart, 32 may be employed to transport stack 31 to another operation such as banding location (not shown) or to storage or shipment facilities.

Figure 2:
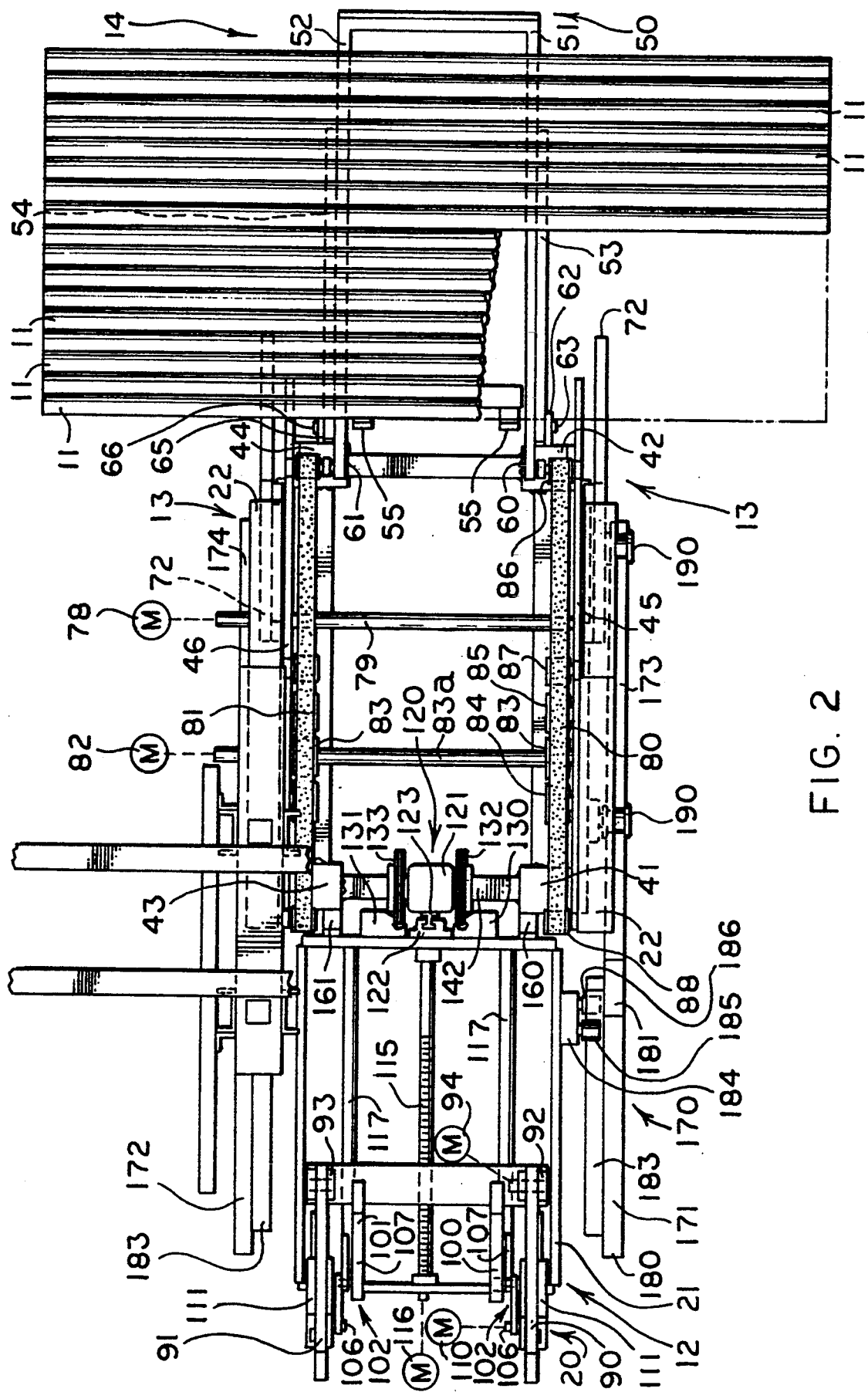
FIG. 2 is a top plan view taken substantially along line 2—2 of FIG. 1.

Tube stacking apparatus 10 will now be described in detail with respect to its component parts. Tube stacking apparatus 10 includes a main framework generally indicated by the numeral 40, which preferably includes support posts 41 and 42 (FIG. 1), and 43 and 44 (FIG. 2). Of course, main framework 40 may include any number of support posts as may be desired or necessary to suit a particular application. Affixed to support posts 41-42 and 43-44 respectively are first and second framework plates 45 and 46.

Tube feed assembly 14, as discussed hereinabove, is used to hold a number of tube 11 for transport to fork assembly 13. As such, tube feed assembly may be in communication with a runout table (not shown) or the like, or an operator may simply load tube onto tube feed assembly 14 by hand or otherwise. The exact configuration of tube feed assembly 14 is therefore, not critical to the practice of this invention.

One useful configuration of tube feed assembly 14 may be provided with an inclinable ramp member indicated generally by the numeral 50 which temporarily hold a quantity of tube 11 for subsequent loading onto fork assembly 13. Ramp member 50 may have two opposing appendages 51 and 52 as depicted in FIG. 2, or it may be of one-piece table top-like design or any equivalent structure (not shown), or the like. Cross-bar supports 53 and 54 are employed for structural integrity, and to assist in positioning ramp member 50 in an inclined position, in any manner conventional in the art. By being inclined, round tube 11 is urged by gravity to roll toward fork assembly 13 to be stacked in the manner described hereinabove. It will be further appreciated that even square or rectangular tube will be urged to move toward fork assembly 13 due to inclination of ramp member 50, although the angle of inclination may have to be greater than that for round pipe, and may be as much as 25 degrees or more (not shown). Stop blocks 55 may be employed in conjunction with ramp member 50 if it is desired by an operator to prevent tube 11 from moving toward fork assembly 13.

In order to change the angle of inclination of ramp member 50, appendage 51 thereof may be pivotally affixed to main framework 40 such as by hinge 60 affixed to framework plate 45 thereof. Similarly, appendage 52 may be affixed to main framework 40 such as by hinge 61 affixed to framework plate 46 thereof (FIG. 2). Furthermore, cross-bar 53 is pivotally affixed to support post 42, via block 62 and pivot 63, and may be pivotally affixed to appendage 51, as by pin connection 64 as would be conventional in the art. Similarly, cross-bar 54 is affixed to support post 44 via block 65 and pivot 66.

Figure 4:
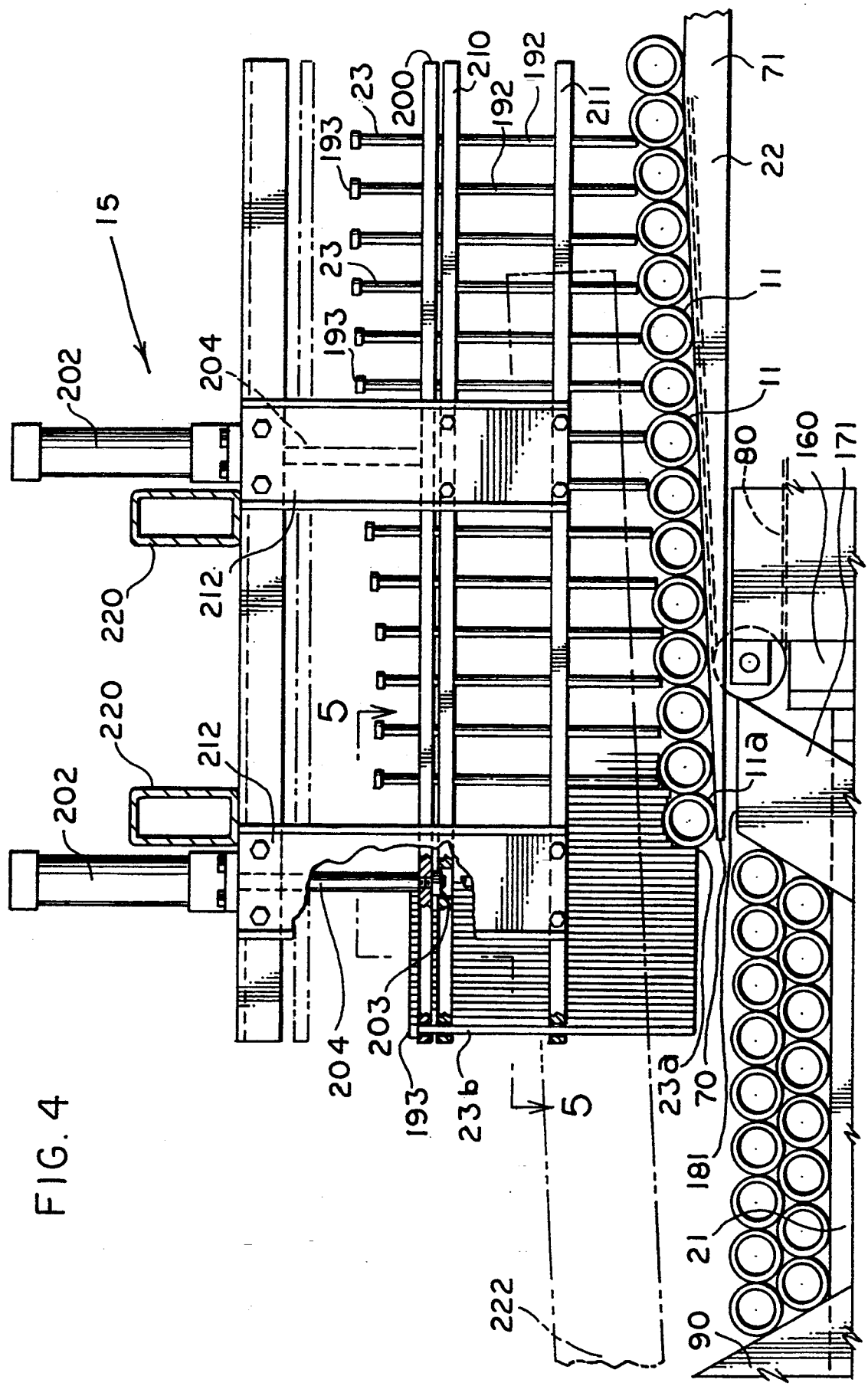
FIG. 4 is an enlarged side elevational view of a portion of the apparatus of FIG. 1.

As previously indicated, fork assembly 13 includes at least one and preferably at least two tine members 22. It is further preferred that tine members 22 have a tapered end as shown in FIGS. 1 and 4. Tines 22 are tapered laterally from an end 70 of smallest dimension to an end 71 of greater dimension. It will be appreciated that the taper of tines 22 cause tube 11 to fall or roll by gravity toward end 70 thereof.

Figure 6:
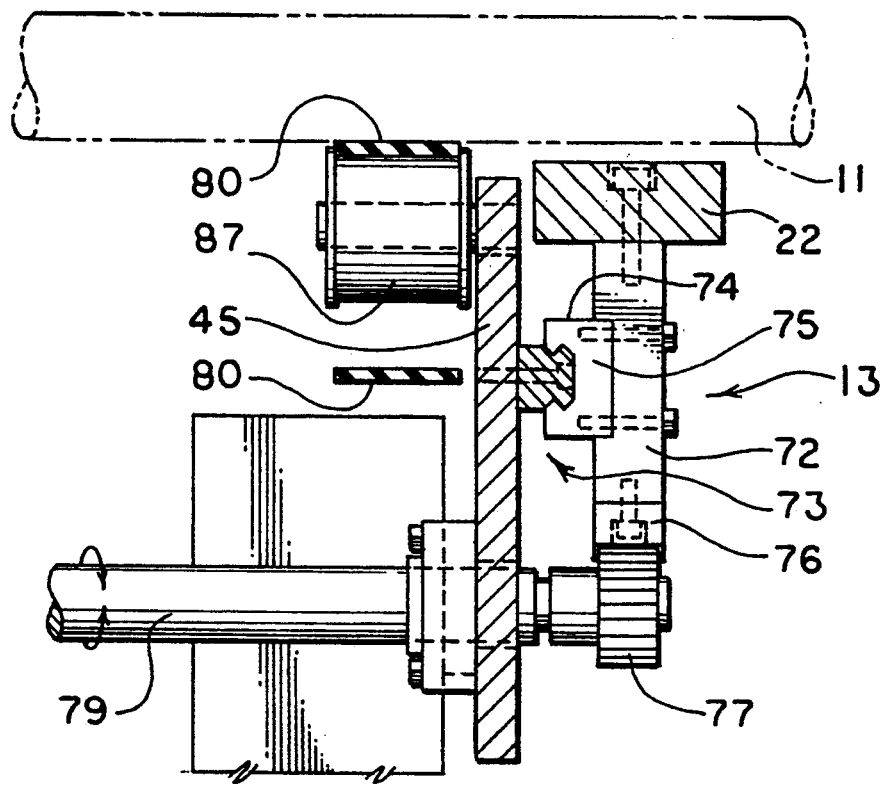
FIG. 6 is an enlarged sectional view taken substantially along line 6—6 of FIG. 1.

Each tine 22 is affixed near end 71 to a drive plate 72 as best shown in FIG. 6. To support drive plates 72, each drive plate 72 is connected to either first or second framework plates 45 or 46 via tongue-and-groove assemblies 73. A tongue member 74 extends from each of first and second framework plates 45 and 46, and engages a groove member 75, such that each drive plate 72 is slidable along the length of each framework plate 45 or 46.

Figure 3:
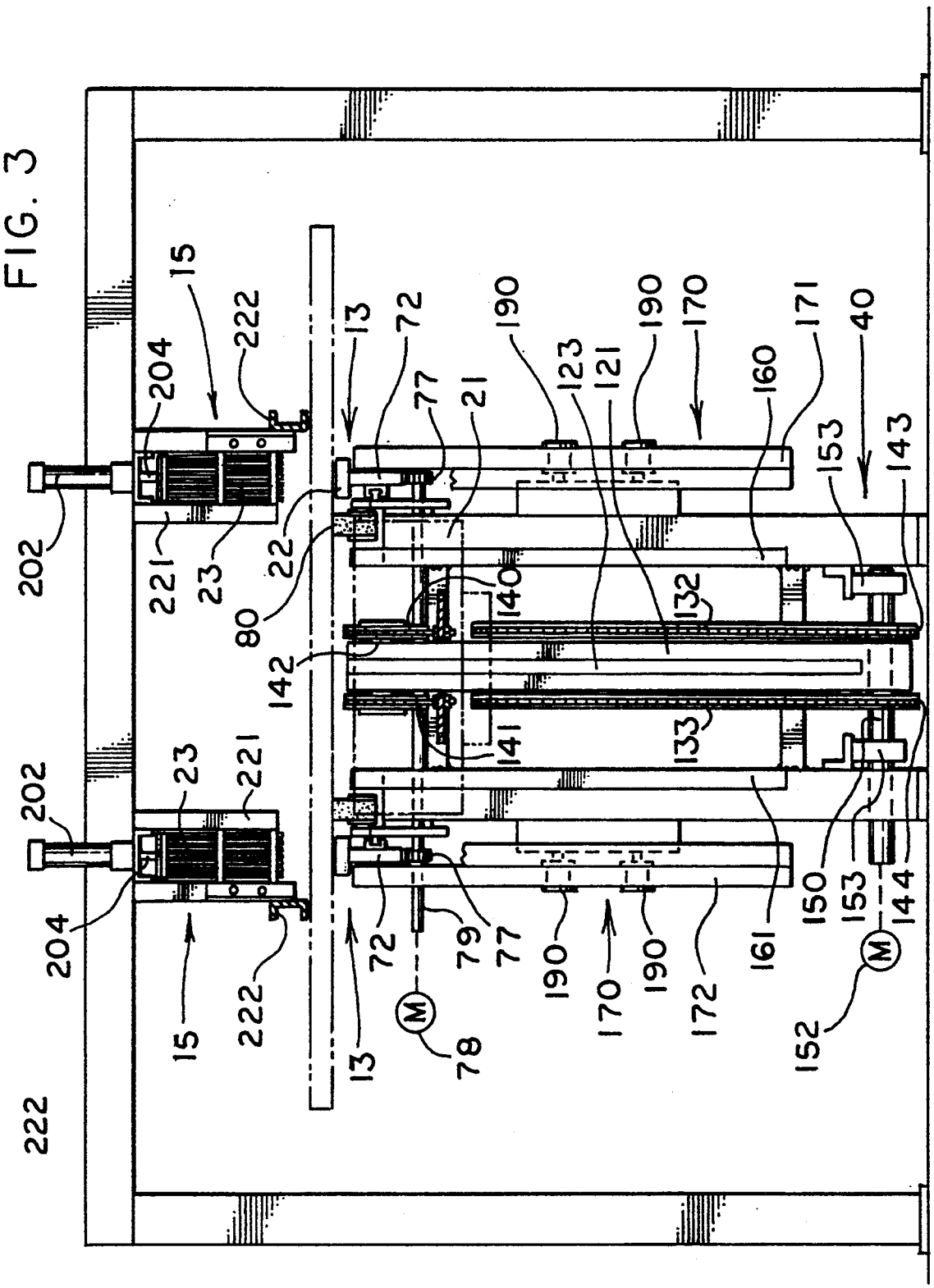
FIG. 3 is a partially schematic end view taken substantially along line 3—3 of FIG. 1.

Each drive plate 72 is configured to have a toothed rack 76 (FIG. 1) on one side thereof, which can be meshed with a toothed pinion 77. Each toothed pinion 77 is power driven such as by a motor 78 schematically represented in the drawings and of conventional design, which drives pinions 77 by rotating drive shaft 79 (FIG. 3). It is further preferred that motor 78 be a selective drive motor, such that the degree and direction of rotation of pinion 77 may be controlled. As pinion 77 is rotated by operation of motor 78, the mesh thereof with rack 76 causes drive plate 72 to move in a lateral direction. By rotating pinion 77 in one direction, drive plate 72 and tine 22 is caused to move in one direction, such as toward upstanding support structure 20. Counter rotation of pinion 77 causes a reverse motion of tine 22 away from upstanding support structure 20. Furthermore, by selectively controlling the degree of rotation of pinion 77, the distance which tine 22 is caused to travel toward and/or away from upstanding support structure 20 may be controlled. This, in turn, controls the number of tube delivered to framing assembly 12 as was discussed hereinabove.

There may also be provided first and second conveyor belts 80 and 81, each driven by motor 82 which drives sprockets 83 via drive shaft 83a, and over which each belt 80 and 81 is tensioned. Pulleys 84, 85, 86, 87 and 88 are also provided to guide belts 80 and 81. Preferably, belts 80 and 81 are positioned proximate and substantially parallel to tine members 22. Conveyor belts 80 and 81 assist in delivering tube 11 to framing assembly 12.

As was discussed hereinabove, framing assembly 12 is employed to hold tube 11 as it is stacked. For stability, upstanding support member 20 is preferably provided with at least two upstanding arms 90 and 91 as is depicted in FIG. 2. Furthermore, each upstanding arm 90 and 91 is pivotable about pivot points 92 and 93, respectively. A motor 94 may be provided in order to pivot upstanding arms 90 and 91 about pivot points 92 and 93 respectively, as is depicted by arrow 95 in FIG. 1. As shown in FIG. 1, upstanding arm 90 (and also arm 91, not shown in FIG. 1) is inclined so as to form one side of, a hexagon, thus forming a framing member for supporting tube 11 in a hexagonal position for forming hexagonal stack 31, if that be desired. As will be appreciated by one skilled in the art, upstanding arm 90 may be pivoted such that its length is substantially perpendicular to the plane of lateral movement of tine member 22, such as may be useful for supporting a square stack of tube 11 (not shown). Furthermore, upstanding arm 90 may also be pivoted to other positions for supporting stacks of tube 11 having other shapes, all of which are within the scope of the present invention.

For forming a hexagonal stack 31 as depicted in the drawings, or for forming other stacks of tube 11 having other shapes, it is desired to provide each upstanding arm 90 and 91 with framing extension arms 100 and 101, respectively (FIG. 2). For purposes which will become clear from the discussion to follow, framing extension arms 100 and 101 are rotatably affixed to upstanding arms 90 and 91 by toggle assemblies 102. Similarly, framing extension arm 101 is rotatably affixed to upstanding arms 91 by an identical toggle assembly also identified in the drawings by the numeral 102.

Each toggle assembly 102 includes a first toggle plate 103 hingedly connected by pivot pin 104 to a second toggle plate 105. Furthermore, each first toggle plate 103 is hingedly affixed to upstanding arms 90 or 91 by second pivot pin 106, and second toggle plates 105 are hingedly affixed to framing extension arms 100 or 101 via third pivot pins 107. A motor drive 110 may be provided to drive pivot pins 106 (FIG. 2) or 107 (not shown) in order to provide for powered pivoting of toggle plates 103 and 105 about those points. Hence, rotation and movement of framing extension arms 100 and 101 to any desired position is effected by simply pivoting the components of framing assembly 12 about pivot pins 104, 106 and 107, as will be appreciated by one skilled in the art. The structure and action of pivot pins 104, 106 and 107 are conventional in the art.

As best shown in FIG. 1, it is preferred that each first toggle plate 103 be affixed to upstanding arms 90 and 91 via a slide block 111. That is, first toggle plates 103 are preferably hingedly affixed to slide block 111 via second pivot pins 106. Furthermore, each slide block 111 is slidable within a track 112. Sliding of slide block 111 is effected via guide pin 113 affixed to slide block 111 and extending into track 112, in a manner conventional and known in the art. Thus, framing extension arms 100 and 101 can be positioned at any location along the lateral length of upstanding arms 90 and 91 for forming the desired shape of framing support through the movement depicted by arrow 114 in FIG. 1.

It is also desired that framing assembly 12 be movable in a lateral direction substantially parallel to the lateral movement of tines 22, so that the size of stack 31 is even further adjustable. By moving framing assembly 12 more toward fork assembly 13, the stack 31 would be smaller. That is, fewer tube would fit in a single row onto cradle 21 than if framing assembly 12 were further away from fork assembly 13. This movement of framing assembly 12 may be accomplished by any means known in the art, such as for example, mounting framing assembly 12 onto a threaded member 115, such that as threaded member 115 is rotated, framing assembly 12 is caused to move toward or away from fork assembly 13. Rotation of threaded member 115 may be accomplished by hand (not shown), or by a selective drive motor 116 as shown in FIG. 2, such that framing assembly 12 may be positioned anywhere along threaded member 115. Guide/support bars 117 can be provided to guide framing assembly 12 as it moves and to support both framing assembly 12 and cradle 21.

As was discussed hereinabove, it is desired that after a row of tube 11 has been delivered to cradle 21 (FIG. 7), cradle 21 be moved downwardly (FIG. 10) so that the next row of tube 11 may be delivered on top of the previously delivered row (FIG. 11) thus effecting stacking (FIG. 12). This movement of cradle 21 may be effected by any means known in the art. One preferred structure for effecting this movement includes a powered, tongue-and-groove slide assembly generally indicated by the numeral 120 (FIG. 2), which will now be described.

Cradle 21 is shown as being mounted upon a center post 121 by a groove member 122 affixed to cradle 21. Groove member 121 receives a tongue 123 extending from center post 121. Tongue 123 is preferably an elongate member extending along and substantially parallel to the length of center post 121, as shown in FIG. 3. Tongue 123 is preferably configured to have a T-shaped cross section, such that it fits within a complementary shaped groove member 122. Cradle 21 may thus move along the vertical length of center post 121, which is a vertical direction in the view of the invention shown in FIG. 3, by sliding along tongue 123.

Again with reference to FIG. 2, cradle 21 is provided with attachment plates 130 and 131 which are affixed in a conventional manner to drive chains 132 and 133, respectively. For example, as shown in FIG. 1, attachment plate 130 may be affixed to drive chain 132 via nut and bolt assembly 134. Furthermore, a lower attachment plate 130a may be provided which is also attached to drive chain 132 in a similar or other conventional manner.

Drive chains 132 and 133 engage upper sprockets 140 and 141, respectively, (FIG. 3) in a manner conventional in the art. Sprockets 140 and 141 are mounted upon axle 142. Drive chains 132 and 133 also engage lower sprockets 143 and 144 in a similar manner. Hence, drive chain 132 extends between and engages upper sprocket 140 and lower sprocket 143; and drive chain 133 extends between and engages upper sprocket 141 and lower sprocket 144. Preferably sprockets 140, 141, 143 and 144 are provided with sprocket teeth which engage individual links in drive chains 132 and 133, in a manner known in the art.

Lower sprockets 143 and 144 are preferably mounted upon a drive shaft 150 which is rotatably driven by a selective drive motor 152. Drive shaft 150 may be supported by shaft bearing mounts 153. As drive motor 152 rotates drive shaft 150, lower sprockets 143 and 144 are caused to rotate, thereby causing drive chains 132 and 133 to move, thus vertically displacing cradle 21. If drive shaft 150 is rotated in one direction, cradle 21 is caused to be lowered, and if drive shaft 150 is counter-rotated cradle 21 is raised, as will be appreciated by one skilled in the art. Guide rails 160 and 161 support and guide cradle 21 as it is raised and lowered.

By providing a selective drive motor 152 which can be employed to rotate drive shaft to a predetermined degree, the distance to which cradle 21 is moved can be preselected and predetermined. Hence, the present invention may be employed to stack tube 11 of different diameters by simply preselecting the distance that cradle 21 must be lowered so that a layer of tube 11 may be stacked, as discussed hereinabove.

When stacking round tube, such as tube 11 depicted in the drawings, or other shapes of tube, it is often necessary to provide proper support for the stacked tube 11, otherwise the tube will roll away and the stack form shape will not be maintained. However, tube 11 must be free to be delivered to framing assembly 12. That is, there must be no structure to impede or otherwise obstruct tube 11 from being moved by fork assembly 13 and/or conveyor belts 80 and 81 to framing assembly 12.

The support structure necessary to form a complete frame with framing assembly 12 is provided according to the present invention by a translational movement frame assembly generally indicated by the numeral 170 on the attached drawings. Translational movement frame assembly 170 includes depending arms 171 and 172 affixed to a lateral support plates 173 and 174. Translational movement frame assembly 170 is affixed to main framework 40 and cradle 21 by means to be hereinafter described, such that as cradle 21 is lowered, translational movement frame assembly 170 is caused to be linearly displaced, so that each arm 171 and 172 forms a support structure complementary to upstanding arms 90 and 91.

Arm 171 has a first end 180 and a second end 181 (FIG. 1). Arm 172 is provided with similar ends that are not depicted in the drawings, but which will be readily understood by one skilled in the art as being identical to arm 171. If tine member 22 is thought of as laterally moving in one plane, then second end 181 of arm 171 may be thought of as being positioned substantially proximate that plane. By actually being positioned below tine member 22, tine member 22 and tube 11 carried thereon are free to pass over second end 181 of arm 171. As shown in sequence in FIGS. 7 through 14, as cradle 21 is lowered, translational movement frame assembly 170 is moved to the right in the views of the invention in the drawings, such that arm 171 complements framing assembly 12 in supporting stack 31.

While linear movement of translational movement frame assembly 170 may be accomplished by any means known in the art and still be within the scope of the invention, it is preferred that translational movement frame assembly 170 be linearly displaced via translational forces transferred from the movement of cradle 21. Each arm 171 and 172 is provided with an elongate flange 183. Cradle 21 carries a cam block 184 positioned in opposition to flange 183, as shown in FIG. 2. Each cam block 184 supports first and second cam rollers 185 and 186, such that first cam roller 185 is positioned on one side of flange 183 and second cam roller 186 is positioned on the opposite side of flange 183. As cradle 21 is lowered, first roller cam 185 engages flange 183, exerting a force thereon, and because of the angle of flange 183 relative to the vertical line of downward movement of cradle 21, arm 171 is caused to be linearly displaced. Lateral support plates 173 and 174 are affixed to main framework 40 by being held between rollers 190 affixed thereto, is also linearly displaced and provides support for arm 171 during such movement, as will be appreciated by one skilled in the art. Hence, the movement of translational movement frame assembly 170 may be said to be "translational" because it is induced by the movement of cradle 21, with forces therefrom being translated to translational movement frame assembly 170 via first and second cam rollers 185 and 186 and flange 183.

As will also be appreciated, if cradle 21 is caused to be raised, second roller cam 186 will engage flange 183 and cause linear movement of translational movement frame assembly 170 to the left of the view as depicted in FIG. 1, such as to reset the tube stacking apparatus 10 for forming of another stack of tube 31. Furthermore, as will also be appreciated by one skilled in the art, by appropriately manipulating the adjustable features of framing assembly 12, cradle 21 translational movement frame assembly 170, stacks or tube can be formed of various shapes, such as hexagonal as depicted, as well as square, rectangular and the like.

Figure 5:
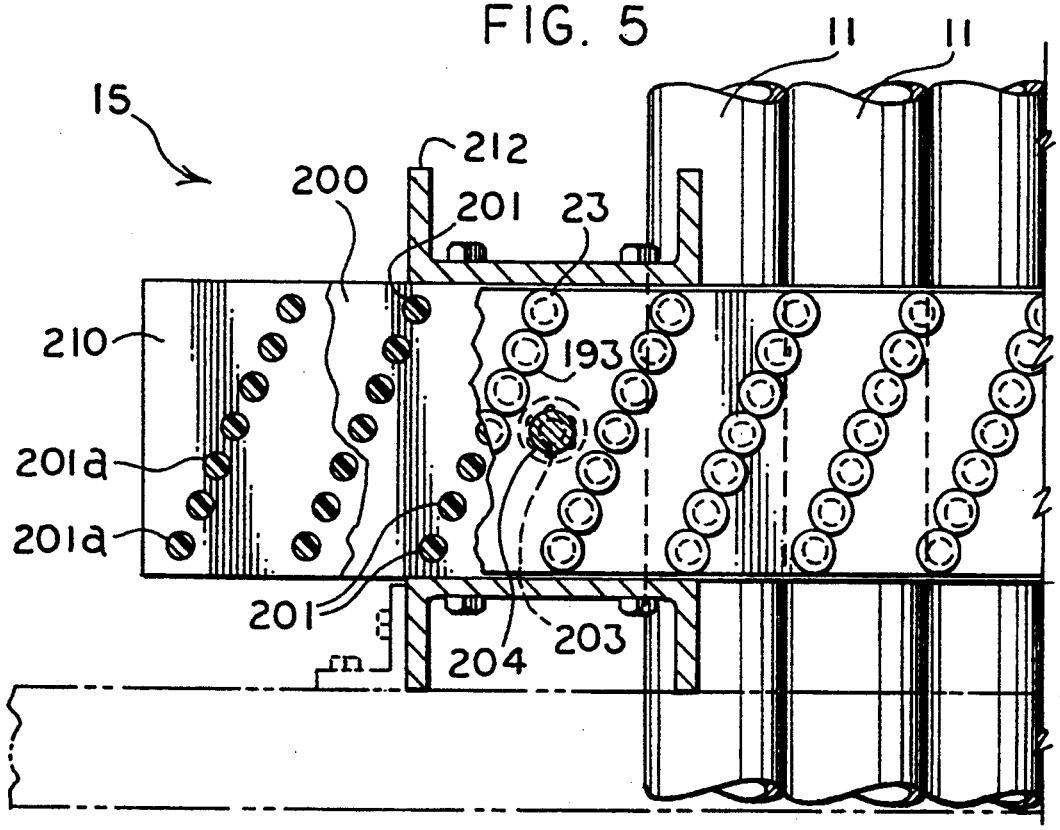
FIG. 5 is a top plan view of a portion of the apparatus shown in FIG. 4 taken substantially along line 5—5 thereof.

Tube restraining assembly 15 will now be described in detail with reference to a preferred embodiment thereof as depicted in the drawings. As best shown in FIG. 4, each free floating finger 23 is provided with an elongate shaft 192 and a head or crown 193. Each finger 23 is supported by an actuating plate 200 having a plurality of apertures 201 (FIG. 5) therein. A single finger 23 is positioned within an aperture 201, and is prevented from being removed from aperture 201 by crown 193 engaging actuating plate 200. Furthermore, it is preferred that actuator plate 200 be provided with a plurality of uniformly spaced diagonal rows of apertures 201, as best shown in FIG. 5. In this way, there is a greater likelihood that at least one finger 23, such as finger 23a in FIG. 4, will engage the last tube 11, such as tube 11a, to prevent tube 11a from rolling off of tine 22 and onto the tube 11 already stacked on framing assembly 12, which action was discussed hereinabove.

Actuator plate 200 is preferably affixed to actuating air cylinders 202 of conventional design such as by thread and nut fasteners 203 on shaft 204. Cylinders 202 may thus be activated so as to cause shaft 204 to be raised or lowered, thus raising or lowering actuator plate 200.

Because fingers 23 are free to move within apertures 201, when actuator plate 200 is caused to move toward tube 11 on fork assembly 13, some fingers come to rest on top of tube 11; some might become nestled therebetween; some, such as finger 23b in FIG. 4, are suspended by contact of crown 193 with actuator plate 200; and at least one finger 23 (23a in FIG. 4) engages the last tube 11 (11a in FIG. 4 on tine 22. As will be appreciated, and as depicted in FIG. 11, when air cylinders 202 are operated so as to raise shaft 204, actuator plate 200 is also raised so as to contact crowns 193 of fingers 23, causing fingers 23 to be disengaged from tube 11, and hence, tines 22 are free to deliver more of tube 11 to framing assembly 12 as discussed hereinabove.

Tube restraining assembly 15 may also be provided with stationary guide plates 210 and 211 which are provided with apertures 201a (FIG. 5) that correspond to the location of apertures 201 in actuator plate 200, for aligning and guiding fingers 23 as will be appreciated by one skilled in the art. Guide plates 210 and 211 may be supported on hanger supports 212.

As shown in FIG. 3, it is preferred to position two tube restraining assemblies 15 at a position proximate to framing assembly 12 and fork assembly 13. Each tube restraining assembly 15 is affixed in that position by any means conventional in the art, such as by use of secondary framework 220 having hangar supports 221.

Furthermore, tube restraining assemblies 15 may also be provided with hold-down members 222, which helps to keep tube 11 in a single row when it is delivered to framing assembly 12. Otherwise, tube 11, especially if round, may have a tendency to "ride up" upstanding arm 90 as it is delivered thereto by fork assembly 13. It will be appreciated that other hold-down devices may be employed other than the one depicted in the drawings. For example, a pivoted hold-down arm (not shown) may be employed which rests upon the tube 11 and is pivoted at one end, as will be appreciated by one skilled in the art.

As was discussed hereinabove, once apparatus 10 has formed a stack 31 a cart 32 may be employed to transport stack 31 from pipe stacking apparatus 10 to another station such as banding (not shown). Cart 32 may be of any type which will accomplish that function, and an exemplary cart 32 is somewhat schematically depicted in the drawings. As shown in FIG. 12, when stack 31 is complete, cart 32 is moved into position proximate cradle 21. Cart 32 is provided with cart frame support arms 230, which may be pivotally mounted to cart 32 via powered pivot hinges 231 or the like. Cart frame support arms 230 may also adjustable toward and away from each other such as via threaded rod 232, the operation of which is conventional in the art. In this way, cart frame support arms 230 are adjustable for the size of stack 32 to be transported. By being pivotable to a horizontal position as shown in FIG. 12, cart frame support arms 230 are free to slide underneath stack 31.

As shown in FIG. 13, by arrows 240, cart frame support arms 230 are then pivoted toward stack 31 and about pivot hinges 231, until cart frame support arms 230 are in a position to support stack 31. Next, as depicted in FIG. 14, framing assembly 12 is pivoted such as at pivot points 92 and 93, as well as about toggle assembly 102, in a manner discussed hereinabove, until framing assembly 12 is in a horizontal position, stack 31 then being supported by cart frame support arms 230. Cart 32 is thus free to move away from pipe stacking apparatus 10, and to transport stack 31 to the next desired location. It will be appreciated by one skilled in the art, that cart 32 may be configured with other support structures or the like and remain within the scope of the invention. For example, a fixed frame assembly may be employed in conjunction with or in place of cart frame support arms 230.

Figure 15:
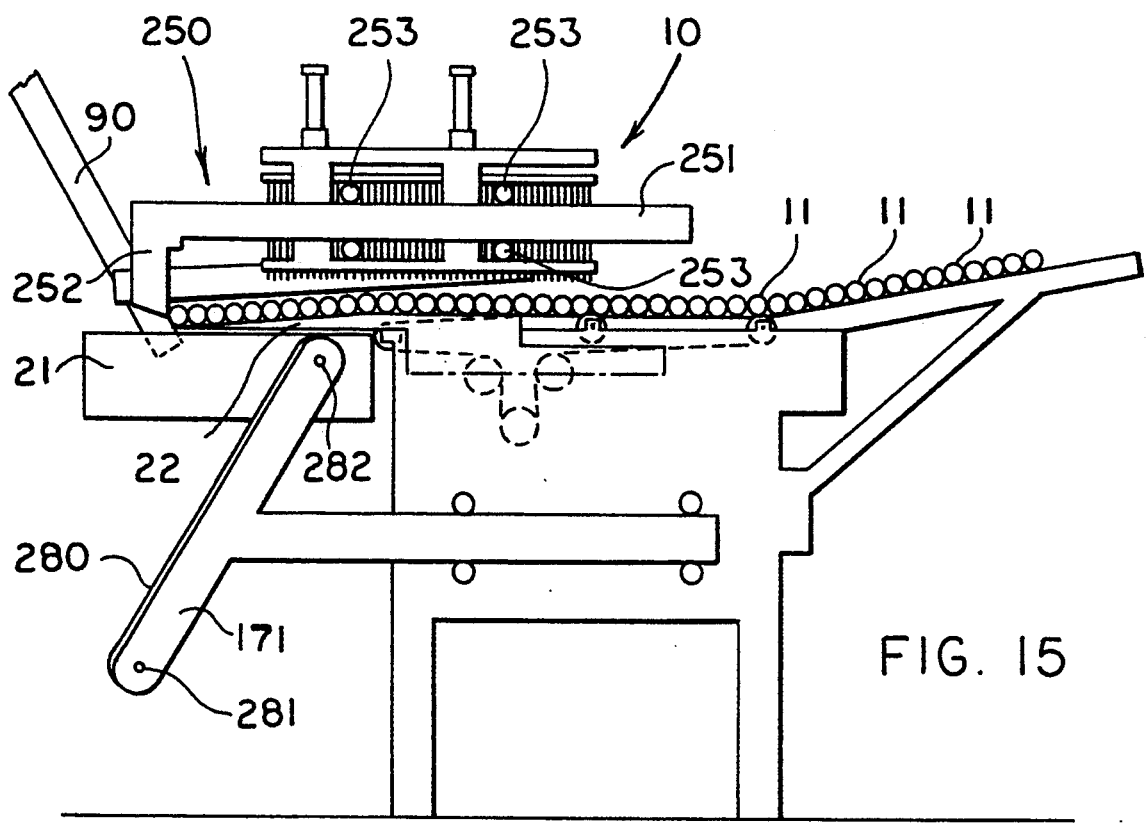
FIG. 15 is a somewhat schematic side elevational view of an alternative embodiment of the present invention.

In another embodiment of the present invention, schematically represented in FIG. 15, tube stacking apparatus 10 is provided with a stop assembly generally designated by the number 250. Stop assembly 250 assists in the proper delivery of the correct number and preselected positioning of tube 11 in a given row of stack 31.

Stop assembly 250 preferably includes an elongate, laterally movable support member 251 carrying a stop member 252 at one end thereof. Stop member 252 may be movably supported by for example, rollers 253, a linear bearing (not shown) or any other conventional means. The overall effective length of stop member 252 may be adjusted, such as by loosening an affixing device such as wing nut 254 threaded to bolt 255, and moving stop member 252 such that bolt 255 moves within a slot 256 formed in stop member 252. Stop member 252 is moved relative to a stop plate 257 which carries bolt 255 and which is affixed to support member 251. When in the correct position, wing nut 254 is tightened and stop member 252 is secured in the selected position and is held securely to stop plate 257.

Figure 16:
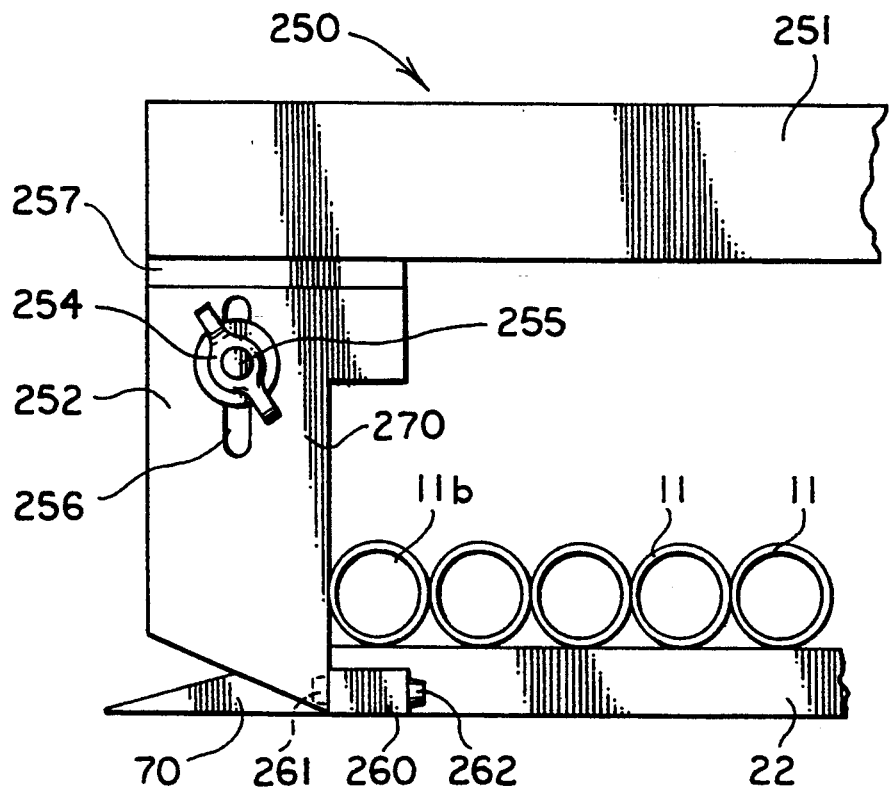
FIG. 16 is a close-up, side elevational and broken view of the alternative stop assembly of FIG. 15.

Tine member 22 can be provided with a pin, rod or block 260 in a location generally proximate to end 70 thereof (FIG. 16). Block 260 is configured upon tine member 22 such that as tine member 22 is laterally moved toward stack 31, block 260 engages stop member 252, causing stop assembly 250 to be laterally displaced with support member 251 moving laterally while being supported by rollers 253. As stated above, the distance that the tine member 22 is moved may be preselected. Hence, the position of stop member 252 may also be preselected thereby. That is, based upon the distance of travel of tine member 22, the stop member 252 carried by support member 251 will be moved to a preselected position. Stop assembly 250 may be provided with a drag brake (not shown) or other braking system, such that when stop assembly 250 is moved to its preselected position by engagement of block 260 with stop member 252, it is restrained from further movement by the brake or braking system.

Block 260 may also be provided with a plunger mechanism having plunger ends 261 and 262. Plunger end 261 encounters face 270 of stop member 252 in order to absorb the shock of the impact of block 260 when it engages face 270. By absorbing the shock, the overall operation is quieter and the useful life of the apparatus is enhanced.

Stop member 252 is configured to have a face 270 positioned normal to the axial plane of tine member 22, and facing tube 11 being delivered by said fork assembly 13. The lead tube of a row of tube 11 being delivered by fork assembly 13, such as tube 11b, engages and is stopped from further movement when the lead tube 11b engages stop member 252 in its preselected position. It will be appreciated that because the lead tube 11b engages the face 270 of stop member 252, and because face 270 is orthogonal to the tube 11 by being generally orthogonal to the lateral movement of tine members 22, there is no vertical vector force created by the engagement to act upon the lead tube 11b. Hence, tube 11b is not caused to be vertically displaced out of its row.

It should also be appreciated that with certain shapes of tube, such as square or rectangular tube, the stop member 252 need not move laterally. In such a circumstance, it is sufficient that the square stop 252 be moved just enough for clearance sake, and then repositioned to align a new row of tube 11.

As stated hereinabove, when forming a stack 31 according to the present invention, upstanding arm 90 (FIG. 15) moves vertically with cradle 21. Therefore, a given point on vertically fixed arm 171 moves vertically with respect to a point on upstanding arm 90. The weight of stacked rows may create a horizontal vector force pushing the last tube 11a in each row against arm 171, especially with round tube. Tube 11 near the middle of a given row may be caused to rotate due to this vector force, and may be horizontally displaced out of a given row. An aspect of the present invention is provided to overcome this problem. It is understood that reference made herein to arm 171 is equally applicable to arm 172.

Figure 17:
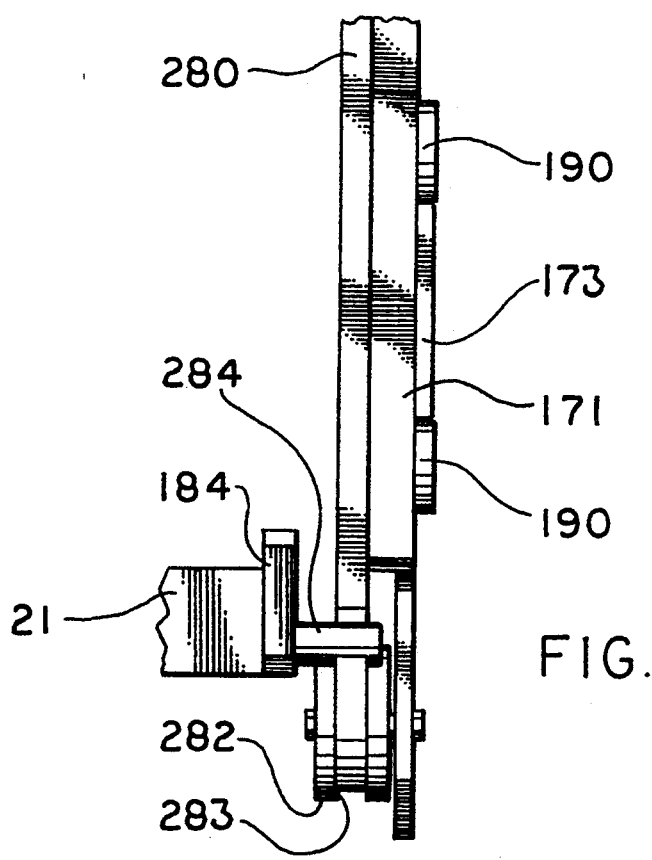
FIG. 17 is a close-up, front elevational and broken view of an alternative embodiment of the present invention, showing a belt used to help prevent displacement of tube in a row.
Figure 18:
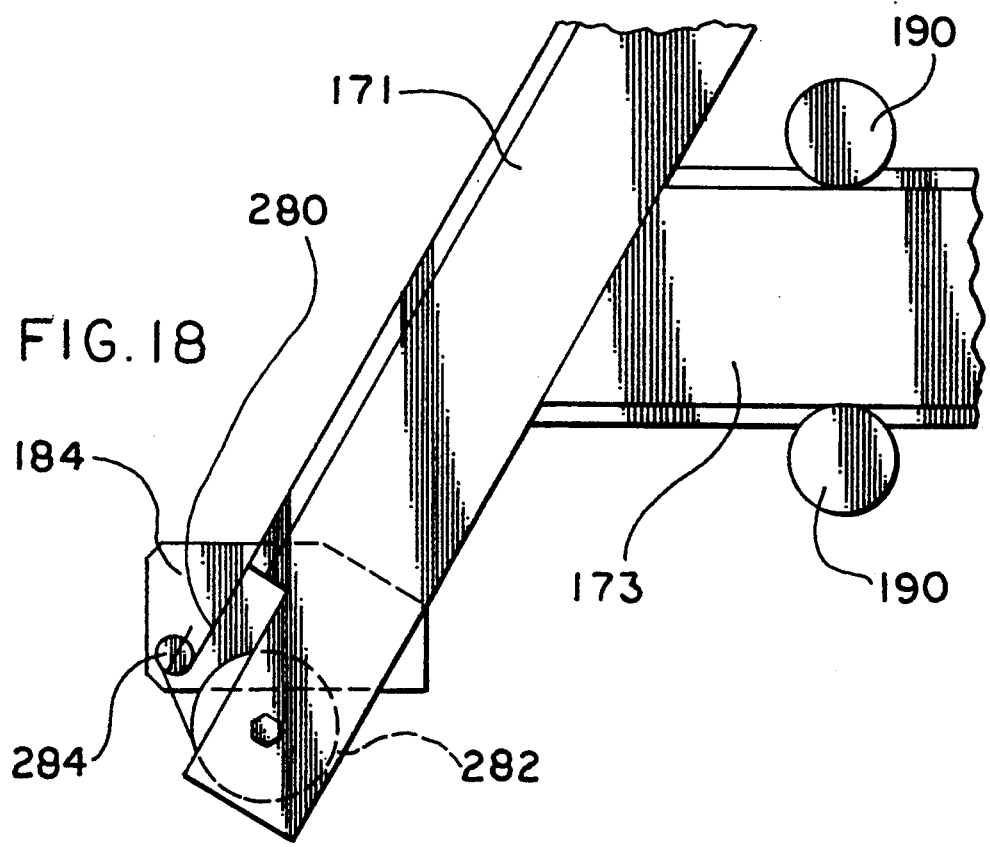
FIG. 18 is a side elevational view of the embodiment of the invention as shown in FIG. 17.

In order to inhibit vertical displacement of tube 11 out of a row of tube 11 already stacked, arm 171 may be provided with a band or belt 280, extending around pulleys 281 and/or guide blocks 282 in respective ends of arm 171 (FIGS. 15 and 17-18). An exemplary guide block is depicted in FIG. 17 as having a channel 283 within which belt 280 is placed. By being made of a suitable smooth material, such as a nylon, teflon coated fiberglass or other polymeric material or the like, belt 280 is free to move within channel 283 and hence, around guide block 282. Pulleys 281 and guide blocks 282, and other means for facilitating movement of belt 280 about arm 171, may be collectively referred to as guide members.

Belt 280 is also affixed to cradle 21 by any conventional means, such as by being clamped to cradle 21. One exemplary means of clamping belt 280 to cradle 21 is shown in the drawings as a slotted pin 284 affixed to cam block 184 which was described hereinabove. One end of belt 280 is placed in slot clamp 284, and then passed around pulley 281 and guide block 282 in arms 171. The other end of belt 280 is then also placed in slot clamp 284 and held securely therein. A second belt 280 (not shown) may also be affixed in a similar manner to arm 172.

Because belt 280 is affixed to cradle 21, belt 280 does not moved relative to tube 11 already stacked. That is, there is relative movement between belt 280 and arm 171, but not between belt 280 and tube 11 already stacked, because as cradle 21 is vertically displaced in the manner described hereinabove, belt 280 remains affixed thereto. The movement of arm 171 relative to cradle 21 is compensated for by relative movement of belt 280 about pulley 281 and guide block 282. It will be appreciated that any means of affixing belt 280, and any means of facilitating relative movement between belt 280 and arm 171 other than pulley 282 or guide block 282, are within the scope of the invention.

Thus it should be evident that the device and methods of the present invention are highly effective in stacking tube. The invention is particularly suited for stacking square or round tube into square, rectangular or hexagonal shaped stacks, but is not necessarily limited thereto. The tube stacking apparatus 10 and methods of the present invention can be used separately with other equipment, together with multiple tube stacking apparatus 10 for stacking longer tube, methods and the like. It will be appreciated that the present invention may also be employed for stacking bundles of tube 11, wherein each bundle is stacked in a manner similar to and individual tube 11 as discussed hereinabove.

Based upon the foregoing disclosure, it should now be apparent that the use of the tube stacking apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described.

We claim:

1. An apparatus for stacking a plurality of rows of tube into a stack of predetermined shape, comprising:
a main frame k;
generally laterally movable fork means for delivering a predetermined quantity of successive rows of tube to the stack, said fork means movable for a preselected distance;
a laterally movable stop means engageable with the lead tube of a given row as the row of tube is delivered by said fork means;
block means affixed to said fork means and releasably engageable with said stop means, such that as said fork means is moved said preselected distance said block means engages said stop means causing said stop means to be moved to a preselected position;
a tube restraining assembly positioned generally proximate said fork means and the stack, and having a plurality of retractable, free floating finger means engageable with the tube on said fork means;
such that the quantity of tube delivered to the stack in a given row and the location of the tube in the given row is determined by the preselected position of said stop means;

the remaining tube on said fork means being restrained thereon by at least one of said finger means.

2. An apparatus, as set forth in claim 1, wherein said fork means is laterally movable in substantially one plane.

3. An apparatus, as set forth in claim 1, further comprising a framing assembly for at least partially supporting the stack, said framing assembly comprising a linearly displaceable arm means having a first end and a second end, wherein said first end is substantially proximate said plane of movement of said fork means.

4. An apparatus, as set forth in claim 3, wherein said arm means is affixed to a lateral support plate, said lateral support plate being affixed to said main framework via roller support means.

5. An apparatus, as set forth in claim 4, wherein said arm means includes a flange extending therefrom and lateral thereto.

6. An apparatus, as set forth in claim 5, further comprising a cradle and means to move said cradle relative to the movement of said fork means, and at least one roller means affixed to said cradle and engaging said flange, such that as said cradle is moved, said roller means engages said flange, urging said arm means to be linearly displaced while said first end of said arm means remains substantially proximate said plane of movement of said fork means.

7. An apparatus, as set forth in claim 6, wherein said arm means includes a band means mounted so as to be generally rotatable about said first and second ends of said arm means.

8. An apparatus, as set forth in claim 7, wherein said band means is mounted upon a first guide member affixed to said first end of said arm means and a second guide member affixed to said second end of said arm means.

9. An apparatus, as set forth in claim 1, wherein said stop means comprises a support member and a stop member, wherein said support member carries said stop member.

10. An apparatus, as set forth in claim 9, wherein said stop member includes a first stop plate and a second stop plate, and said second stop plate is variably positionable with respect to said first stop plate, so that the length of said stop member is variable.

11. An apparatus to stack tube in a framing assembly comprising:
a tube restraining assembly positioned proximate the framing assembly and having a plurality of free floating fineness to engage and restrain at least one of the tube to prevent the tube from moving into the framing assembly;
said framing assembly having at least one variably positionable upstanding arm for at least partially supporting the stacked tube;
said at least one upstanding arm having a movable belt thereon for engaging at least one of the stacked tube, thereby substantially preventing vertical displacement of the tube engaging said belt as said at least one upstanding arm is variably positioned.

12. An apparatus, as set forth in claim 11, wherein said at least one upstanding arm bas a first and second end, and has a separate guide member affixed at each of said first and second ends, said belt being supported by and movable about said guide members.

13. A method of positioning tube from a continuous supply of tube, in a preselected stacked configuration in a stack forming assembly by movement of a fork member positionable under selected of the tube comprising the steps of:
a) moving a stop means to a preselected location by engaging said stop means with a block means carried by the fork member and moving the fork member a preselected distance to position a preselected number of the tube in the forming assembly;
b) restraining the remainder of the supply of tube;
c) retracting the fork member a predetermined distance away from the forming assembly while said stop means remains in said predetermined position;
d) lowering the forming assembly so that additional tube may be positioned on top of the tube already positioned therein;
e) at least partially retracting said stop means;
e) releasing the remainder of the continuous supply of tube while again moving the fork member a preselected distance to position a preselected number of tube on top of the tube already positioned in the forming assembly;
f) and repeating steps (b) through (e) until the preselected stacked configuration is achieved.

* * * * *